United States Patent [19]

Umezawa et al.

[11] Patent Number: 4,748,865
[45] Date of Patent: Jun. 7, 1988

[54] DEVICE FOR ABSORBING IMPULSIVE TORQUE IN MOTOR WITH WORM GEAR

[75] Inventors: Norio Umezawa; Yohji Maki, both of Takefu; Katsuhiro Murano, Ootsu, all of Japan

[73] Assignee: Matsushita Electric Industrial Co., Ltd., Japan

[21] Appl. No.: 737,051

[22] Filed: May 22, 1985

[51] Int. Cl.⁴ .......................... F16H 1/16; F16D 3/68
[52] U.S. Cl. ........................ 74/411; 74/425; 464/92
[58] Field of Search .............. 74/425, 411, 444, 445, 74/574; 192/55, 30 V; 464/92, 149, 155, 180, 73

[56] References Cited

U.S. PATENT DOCUMENTS

| | | | |
|---|---|---|---|
| 1,694,064 | 12/1928 | Jencick | 464/92 |
| 1,726,825 | 9/1929 | Hawkins | 192/55 X |
| 2,070,329 | 2/1937 | Brecht | 464/92 |
| 2,841,967 | 7/1958 | Baker | 464/73 |
| 2,924,082 | 2/1960 | Reich | 464/92 X |
| 3,138,039 | 6/1964 | Zeidler et al. | 74/574 |
| 3,195,324 | 7/1965 | Sellwood et al. | 74/411 |
| 3,406,583 | 10/1968 | Baier | 74/411 |
| 3,504,776 | 4/1970 | Misenti | 192/55 |
| 3,545,585 | 12/1970 | Eaton | 192/55 X |
| 3,552,145 | 1/1971 | Barton et al. | 464/73 |
| 3,613,472 | 10/1971 | Help | 74/411 |
| 3,635,100 | 1/1972 | Littmann | 74/425 |
| 3,789,690 | 2/1974 | Droske | 74/411 |
| 3,821,907 | 7/1974 | Habert | 74/425 |
| 3,902,333 | 9/1975 | Dossier | 464/73 |
| 4,367,660 | 1/1983 | Becker et al. | 74/411 |
| 4,368,807 | 1/1983 | Mclean et al. | 74/574 |
| 4,378,865 | 4/1983 | McClean | 74/574 |
| 4,428,250 | 1/1984 | Becker et al. | 74/425 |

FOREIGN PATENT DOCUMENTS

| | | | |
|---|---|---|---|
| 355379 | 2/1980 | Austria . | |
| 2706034 | 8/1978 | Fed. Rep. of Germany | 464/73 |
| 2029223 | 12/1982 | Fed. Rep. of Germany | 464/180 |
| 84273941 | 9/1984 | Fed. Rep. of Germany . | |
| 1050869 | 1/1954 | France . | |
| 524749 | 8/1940 | United Kingdom . | |
| 0549615 | 4/1977 | U.S.S.R. | 192/55 |

Primary Examiner—Allan D. Herrmann
Attorney, Agent, or Firm—Lowe, Price, LeBlanc, Becker & Shur

[57] ABSTRACT

A motor coupled with a worm gear for output power transmission has a motor shaft with a worm held in mesh with the worm gear. The worm gear has a plurality of circumferentially spaced holes. An annular damper of rubber has a plurality of first circumferentially spaced projections on one axial surface thereof and fitted respectively in the holes in the worm gear, and a plurality of second circumferentially spaced projections on the opposite axial surface thereof and fitted respectively in a plurality of circumferentially spaced holes defined in a torque transmission disc coupled to a power output shaft for corotation.

6 Claims, 6 Drawing Sheets

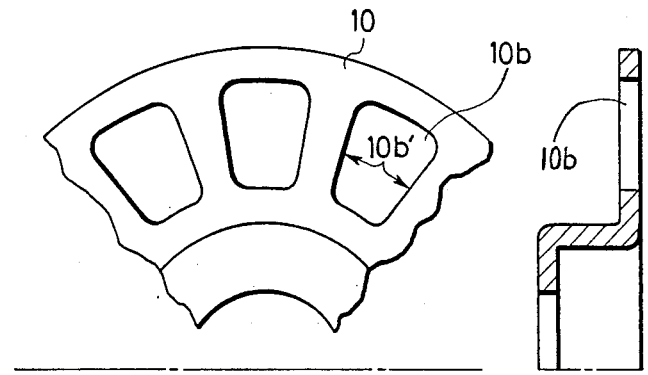
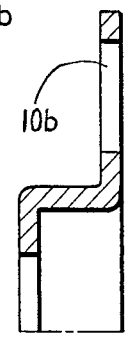
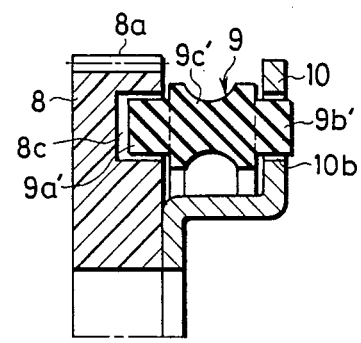
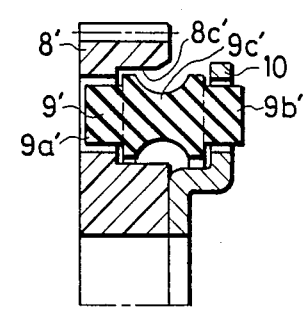

DEVICE FOR ABSORBING IMPULSIVE TORQUE IN MOTOR WITH WORM GEAR

BACKGROUND OF THE INVENTION

The present invention relates to a device for absorbing impulsive torques applied to a motor combined with a worm gear, such for example as a motor for use in an automobile window regulator.

There are known worm gears meshing with worms on the output shafts of motors. Since the output shaft of the motor is locked against rotation when the worm gear is forcibly rotated and the worm and worm gear coupling provides a large speed reduction ratio, the motor coupled with the worm gear finds many applications in which the object driven by the motor is to be held in a stopped position and the motor is subjected to a low-speed, high-torque load. The self-locking capability of the worm and worm gear mechanism is however disadvantageous in that the teeth of the worm and worm gear may be broken when an undue impulsive torque is imposed thereon in a reverse direction because the impact force is directly applied to the teeth inasmuch as the motor output shaft is not rotated by the worm gear.

In uses where the motor is to be started and stopped repeatedly, impulsive torques are generated due to the moment of inertia of the motor and the load to apply impact forces to the teeth of the worm and worm gear.

The foregoing problems are experienced particularly with drive motors for use in window regulators and sliding roof mechanisms in automobiles.

One known motor with a worm gear, incorporating a conventional device for absorbing impulsive torques, is illustrated in FIGS. 1 through 6. As shown in FIGS. 1 and 2, the rotative power from a motor output shaft 1 is transmitted to a worm gear or wheel 2 and then to a power output shaft 7 through a device for absorbing impulsive torques. As illustrated in FIGS. 3 and 4, the known device for absorbing impulsive torques is composed of an annular damper 5 of rubber which is bonded in joined relation to an inner ring 6 of iron and an outer ring 4 of iron. The joined assembly of the annular damper 5 and the inner and outer rings 6, 4 is force-fitted in an iron ring 3 having a plurality of tongues $3a$ fitted respectively in slots $2a$ defined in the worm gear 2, also as shown in FIGS. 5 and 6.

FIGS. 7 and 8 illustrate another conventional device for absorbing impulsive torques. This device has no outer ring, but the annular damper 5 is positioned between the inner ring 6 and a ring $3a'$ with its tongues 3 fitted in the slots in the worm gear.

The illustrated prior devices for absorbing impulsive pulses require two or three iron rings to be positioned between the worm gear 2 and the power output shaft 7. The rubber damper 5 is required to be cured to the iron rings. Therefore, the conventional arrangements are composed of many parts and manufactured in a number of complex processing steps, a fact which is not desirable for achieving a required degree of operation reliability of the devices.

SUMMARY OF THE INVENTION

It is an object of the present invention to provide a device for absorbing impulse torques in motors combined with worm gears, which is composed of a reduced number of parts, is manufactured in a less complex process and at a reduced cost, and is highly reliable in operation.

According to the present invention, a worm gear held mesh with a worm on the motor shaft of a motor has a plurality of circumferentially spaced holes. An annular damper of rubber has a plurality of first circumferentially spaced projections on one axial surface thereof and fitted respectively in the holes in the worm gear, and a plurality of second circumferentially spaced projections on the opposite axial surface fitted thereof and respectively in a plurality of circumferentially spaced holes defined in a torque transmission disc coupled to a power output shaft for corotation.

The worm gear, the annular damper, and the torque transmission disc jointly constitute a device for absorbing impulsive torques. Since the device is composed of a small number of parts, it is compact and lightweight and is suitable particularly for use as motors employed in automobiles. The device can also be assembled with ease.

BRIEF DESCRIPTION OF THE DRAWINGS

The present invention will be described in detail by way of illustrative example with reference to the accompanying drawings, in which;

FIG. 12 is a fragmentary front elevational view of a torque transmission disc in the device of FIG. 10;

FIG. 13 is a cross-sectional view of the torque transmission disc of FIG. 12;

FIG. 14 is a fragmentary cross-sectional view of a device for absorbing impulsive torques according to another embodiment of the present invention; and FIG. 15 is a fragmentary cross-sectional view of a modified device for absorbing impulsive torques according to the present invention.

DETAILED DESCRIPTION

Figure 2:
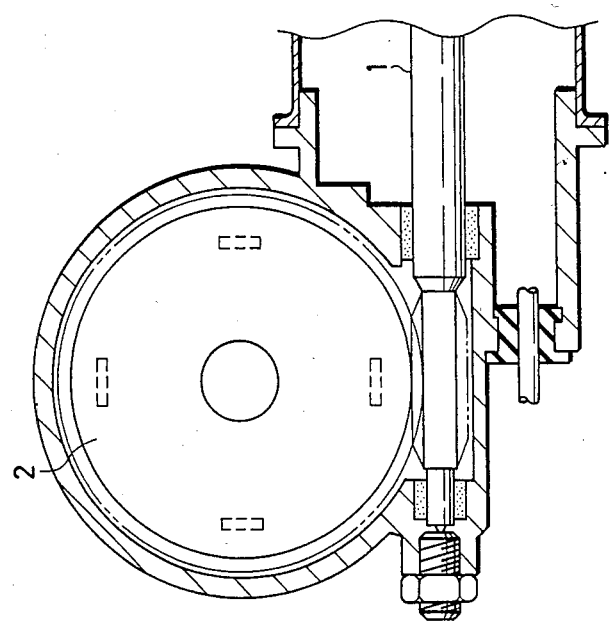
FIGS. 1 and 2 are cross-sectional views, respectively, of a conventional device for absorbing impulsive torques in a motor coupled with a worm gear.
Figure 1:
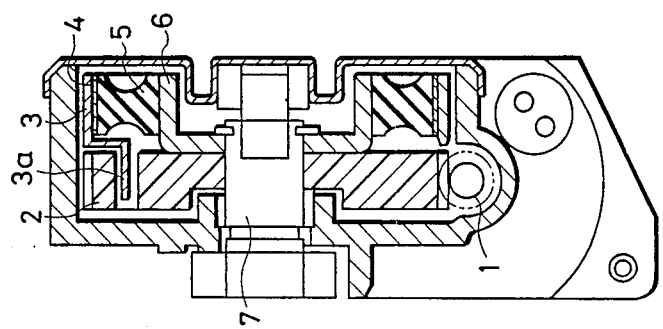
Figure 3:
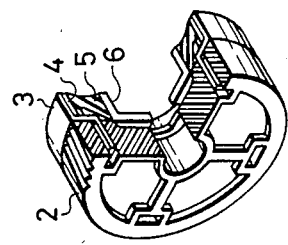
FIG. 3 is a perspective view, partly cut away, of the device shown in FIGS. 1 and 2.
Figure 4:
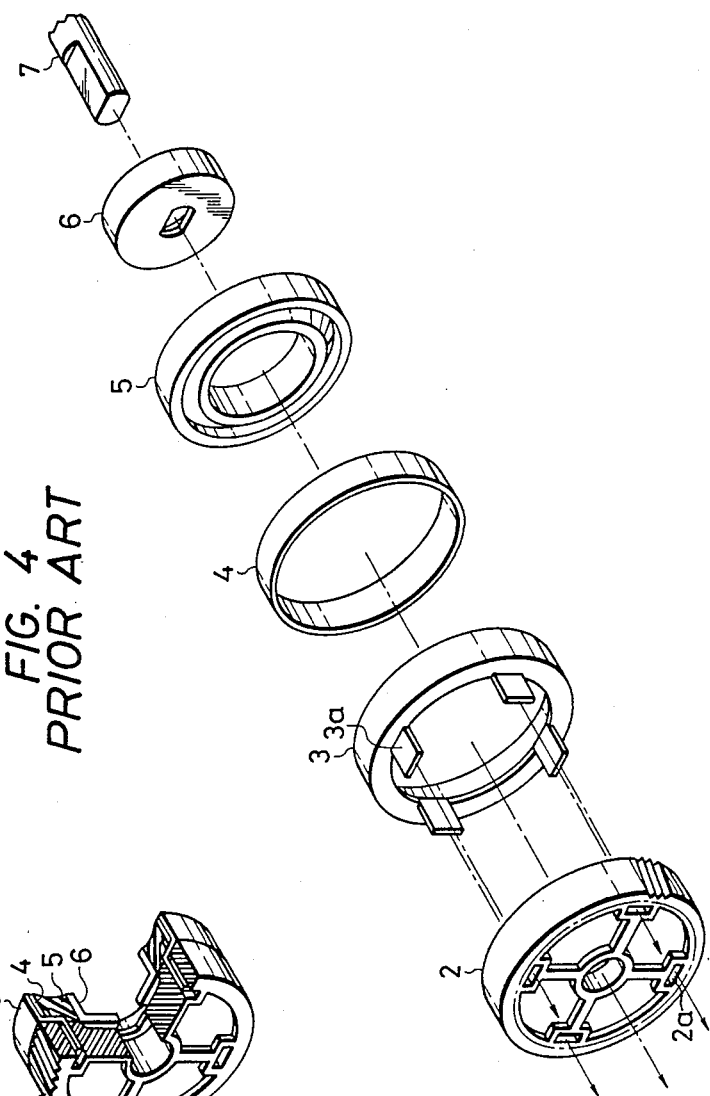
FIG. 4 is an exploded perspective view of the device shown in FIG. 3.
Figure 5:
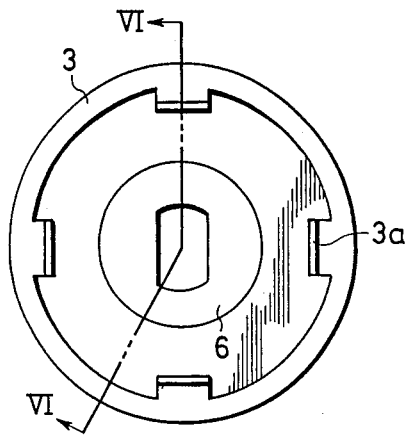
FIG. 5 is a front elevational view of the device of FIG. 3.
Figure 6:
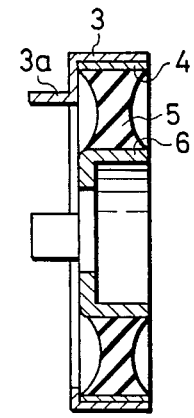
FIG. 6 is a cross-sectional view taken along line VI—VI of FIG. 5.
Figure 7:
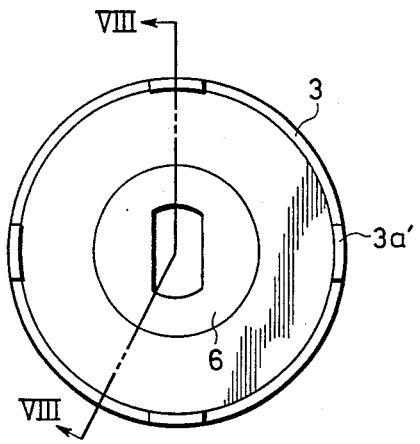
FIG. 7 is a front elevational view of another conventional device for absorbing impulsive torques.
Figure 8:
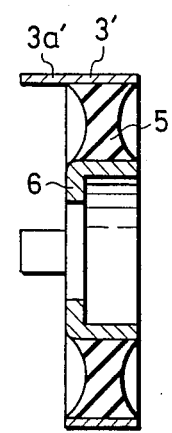
FIG. 8 is a cross-sectional view taken along line VIII—VIII of FIG. 5.
Figure 9:
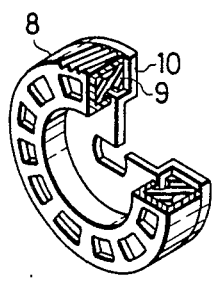
FIG. 9 is a perspective view, partly cut away, of a device for absorbing impulsive torques according to the present invention.
Figure 10:
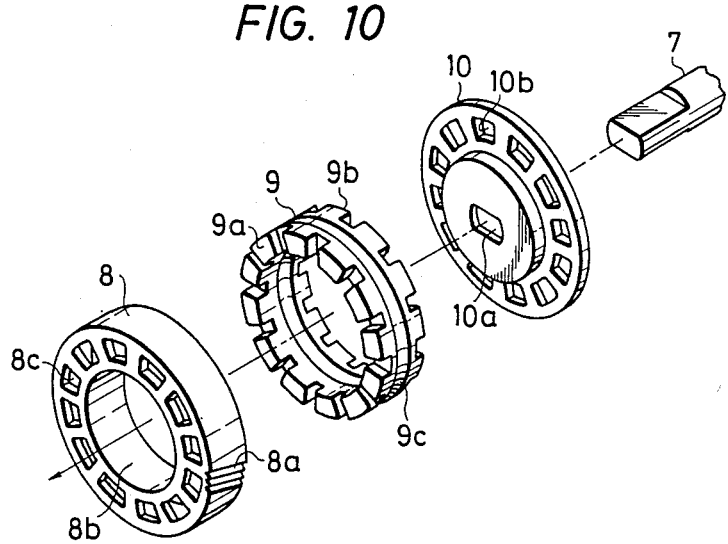
FIG. 10. is an exploded perspective view of the device illustrated in FIG. 9.

FIGS. 9 and 10 show a device for absorbing impulsive torques according to an embodiment of the present invention. A worm gear or wheel 8 of synthetic resin has gear teeth $8a$ (partly shown in FIGS. 9 and 10) on its outer periphery and a central hole $8b$. The worm gear 8 also has a plurality of holes $8c$ defined axially therethrough and radially positioned between the toothed outer periphery and the central hole $8b$. The holes $8c$ are circumferentially spaced at equal angular intervals.

The device for absorbing impulse torques includes an annular damper 9 of rubber having a plurality of projections 9a, 9b on axially opposite surfaces thereof, the projections 9a, 9b being circumferentially spaced at equal angular intervals. The annular damper 9 includes an axially central layer 9c of thin configuration which is elastically deformable relatively easily when subjected to shearing forces at the time the projections 9a, 9b are twisted in opposite directions around the axis of the annular damper 9. There are as many projections 9a or 9b as the holes 8c in the worm gear 8. The projections 9a, 9b are shaped in substantially identical relation to the holes 8c. The device also includes a torque transmission disc 10 for transmitting rotative power from the worm gear 8 to a power output shaft 7. The torque transmission disc 10 has a central hole 10a in which the power output shaft 7 is fitted and as many holes 10b as the holes 8c, the holes 10b being positioned along an outer peripheral edge and spaced circumferentially at equal angular intervals. The holes 10b are of a shape identical to the shape of the holes 8c.

For assembly, the worm gear 8 and the torque transmission disc 10 are disposed one on each side of the annular damper 9 in the axial direction. The projections 9a of the annular damper 9 are inserted respectively in the holes 8c in the worm gear 8, while the projections 9b are inserted respectively in the holes 10b in the torque transmission disc 10. With this arrangement, the device is composed of a smaller number of parts than those of the conventional device, and can be assembled easily without requiring the complex process of bonding the annular damper 9 in joined relation to the worm gear 8 and the torque transmission disc 10. The device is therefore highly reliable in operation.

Figure 11:
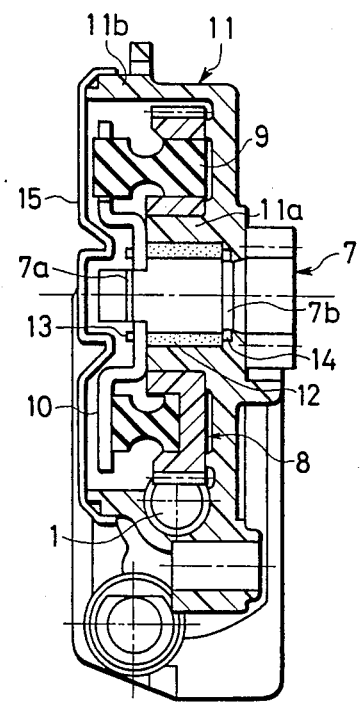
FIG. 11 is a cross-sectional view of the device shown in FIG. 9, as combined with a worm gear.

FIG. 11 shows the device as assembled in combination with a worm gear mechanism. A gear case 11 of synthetic resin has a central cylindrical bearing boss 11a in which there is disposed a bearing 12 supporting the power output shaft 7. The bearing boss 11a is fitted in the hole 8b in the worm gear 8. The torque transmission disc 10 is retained on the power output shaft 7 by a retaining ring 13 partly fitted in a groove 7a on the power output shaft 7. An O-ring 14 is fitted in a groove 7b on the power output shaft 7 for preventing lubricating oil from leaking out through the gap between the power output shaft 7 and the gear case 11. The gear case 11 has an, axial opening defined by an annular flange 11b and closed off by a cover 15 having its outer peripheral edge fastened to the flange 11b of the gear case 11 which defines the opening in the case 11.

FIGS. 12 and 13 illustrate the torque transmission disc in greater detail. Each of the holes 10b in which the projections 9b of the annular damper 9 are to be fitted, respectively, has circumferentially opposite edges 10b' which, in use, are subjected to rotative forces in a direction tangential to the axis of rotation of the torque transmission disc 10. The edges 10b' lie along radial straight lines passing through the axis of rotation of the torque transmission disc 10. Therefore, the rotative forces transmitted from the projections 9b are perpendicularly applied to the edges 10b' and hence would not be divided into radially inward and outward components when acting on the edges 10b'. The holes 8c in the worm gear 8 are also defined by circumferentially opposite edges lying along radial straight lines passing through the axis of rotation of the worm gear 8.

If the edges 10b' were not positioned on the straight radial lines, the applied rotative forces would be divided into some components which would tend to force the projections 9b radially outwardly or inwardly, thereby deforming or tearing off the projections 9b. However, the rotative forces are imposed perpendicularly to the edges 10b' of the holes 10b, the projections 9b are not subjected to such deforming forces.

FIG. 14 shows a device for absorbing impulsive forces according to another embodiment of the present invention. The device includes an annular damper 9' having an axially central layer 9c' of an increased radial width on which the projections 9a', 9b' are disposed. The thicker layer 9'c is advantageous in that it is subjected to less twisting or shearing stresses when the projections 9a', 9b' are twisted in the opposite directions. To make the device with the thicker annular damper 9' more compact, the projections 9a and part of the central layer 9c' may be disposed in wider holes 8c' in the worm gear 8', as shown in FIG. 15.

Although certain preferred embodiments of the present invention have been shown and described in detail, it should be understood that various changes and modifications may be made therein without departing from the scope of the appended claims.

We claim:

1. A worm gear power transmission mechanism driven by a motor having a motor shaft, comprising:
   (a) a worm on said motor shaft;
   (b) a worm gear having gear teeth on an outer periphery thereof held in mesh with said worm, a central hole for insertion of a power output shaft therein, and a plurality of first circumferentially spaced holes defined therein radially between said outer periphery and said central hole;
   (c) a torque transmission disc having a central hole for fixed insertion of the power output shaft therein and a plurality of second circumferentially spaced holes defined therein along an outer peripheral edge thereof; and
   (d) an annular damper of resilent material disposed between said worn gear and said torque transmission disc and having an axially central layer held out of bonding engagement with said worm gear and said torque transmission disc, a plurality of first circumferentially spaced projections disposed on one axial surface of said axially central layer and fitted respectively in said first circumferentially spaced holes in torque transmitting relation, and a plurality of second circumferentially spaced projections disposed on the opposite axial surface of said axially central layer and fitted respectively in said second circumferentially spaced holes in torque transmitting relation, said axially central layer being elastically deformable when subjected to shearing forces at the time said first and second projections are twisted in opposite directions.

2. A worm gear power transmission mechanism driven by a motor driven shaft, comprising:
   (a) a worm on said motor shaft;
   (b) a worm gear having gear teeth on an outer periphery thereof held in mesh with said worm, a central hole for insertion of a power output shaft therein, and a plurality of first circumferentially spaced holes defined therein radially between said outer periphery and said central hole;
   (c) a torque transmission disc having a central hole for fixed insertion of the power output shaft therein and a plurality of second circumferentially spaced holes defined therein along an outer peripheral edge thereof; and (d) an annular damper of resilient material axially disposed between said worm gear and said torque transmission disc and having an axially central layer, a plurality of first spaced projections disposed on one axial surface of said axially central layer and fitted respectively in said first circumferentially spaced holes, and a plurality of second circumferentially spaced projections disposed on the opposite axial surface of said axial central layer and fitted respectively in said second circumferentially spaced holes, wherein each of said first and second circumferentially spaced holes has circumferentially opposite edges lying along radial generally straight lines passing generally through the axis of rotation of said worm gear and said torque transmission disc, said first circumferentially spaced projections and said second circumferentially spaced projections being substantially identical to each other and wherein substantially each of said first and second circumferentially spaced projections have opposite edges lying along radial generally straight lines passing generally through the axis of rotation of said damper, said central layer of resilient material being sufficiently thin as to deform upon application of rotative torque to the annular damper which deformation causes relative rotation between the first and second projections.

3. A worm gear power transmission mechanism according to claim 7, wherein said first and second circumferentially spaced holes and projections are spaced at equal angular intervals.

4. A worm gear power transmission mechanism according to claim 2, wherein said first circumferentially spaced holes are equal in number to said first circumferentially spaced projections, and said second circumferentially spaced holes are equal in number to said second circumferentially spaced projections.

5. A worm gear power transmission mechanism according to claim 2, wherein said first circumferentially spaced holes in said worm gear are shaped to accommodate therein said first circumferentially spaced projections and part of said axially central layer of said annular damper.

6. A worm gear power transmission mechanism according to claim 2, wherein said axially central layer has a groove defined in at least one of inner and outer circumferential surfaces thereof.

* * * * *